United States Patent
Linde et al.

(10) Patent No.: US 12,030,258 B2
(45) Date of Patent: Jul. 9, 2024

(54) METHOD FOR THE RESISTANCE WELDING OF FIBER-COMPOSITE COMPONENTS TO GIVE A FIBER-COMPOSITE STRUCTURE, FIBER-COMPOSITE STRUCTURE AND FIBER-COMPOSITE COMPONENT

(71) Applicant: Airbus Operations GmbH, Hamburg (DE)

(72) Inventors: Peter Linde, Hamburg (DE); Norbert Heltsch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 474 days.

(21) Appl. No.: 16/144,067

(22) Filed: Sep. 27, 2018

(65) Prior Publication Data
US 2019/0091940 A1 Mar. 28, 2019

(30) Foreign Application Priority Data
Sep. 28, 2017 (DE) ...................... 10 2017 217 294.0

(51) Int. Cl.
| | |
|---|---|
| B29C 65/34 | (2006.01) |
| B29C 65/00 | (2006.01) |
| B29C 65/48 | (2006.01) |
| B29L 31/30 | (2006.01) |

(52) U.S. Cl.
CPC ...... *B29C 65/3492* (2013.01); *B29C 65/3436* (2013.01); *B29C 65/3496* (2013.01);
(Continued)

(58) Field of Classification Search
CPC ............ B29C 65/3436; B29C 65/4815; B29C 65/3416; B29C 65/344; B29C 65/3468;
(Continued)

(56) References Cited

U.S. PATENT DOCUMENTS 5,571,435 A * 11/1996 Needham ............ B29C 65/3436
156/379.7
6,177,649 B1 * 1/2001 Juret .................... B23K 26/032
219/121.63
(Continued)

FOREIGN PATENT DOCUMENTS

DE 10 2010 007 824 A1 8/2011
DE 102010007824 A1 * 8/2011 ........... B29C 65/344
(Continued)

OTHER PUBLICATIONS

Lerf E. Asp, "Realisation of Structural Battery Composite Materials", Jul. 2015, pp. 2-10 (Year: 2015).*
(Continued)

*Primary Examiner* — Dana Ross
*Assistant Examiner* — Joe E Mills, Jr.
(74) *Attorney, Agent, or Firm* — KDW Firm PLLC

(57) ABSTRACT

A method for resistance welding of two fiber-composite components to give a fiber-composite structure includes arranging conductive fibers within a jointing region of the two fiber-composite components, where each conductive fiber includes a carbon fiber with an electrically insulating coating. An electric current is passed through the conductive fibers to heat the jointing region to a welding temperature and melt the fiber-composite components in the jointing region. The jointing region is hardened in a manner that bonds the two fiber-composite components by way of the jointing region to give the fiber-composite structure.

16 Claims, 2 Drawing Sheets

(52) U.S. Cl.
CPC ...... *B29C 65/4815* (2013.01); *B29C 66/1122* (2013.01); *B29C 66/45* (2013.01); *B29C 66/71* (2013.01); *B29C 66/721* (2013.01); *B29C 65/3416* (2013.01); *B29C 65/344* (2013.01); *B29C 65/3468* (2013.01); *B29C 66/9141* (2013.01); *B29C 66/91651* (2013.01); *B29C 66/919* (2013.01); *B29L 2031/3076* (2013.01)

(58) Field of Classification Search
CPC ............ B29C 65/3492; B29C 65/3496; B29C 66/1122; B29C 66/45; B29C 66/71; B29C 66/721; B29C 66/7212; B29C 66/73115; B29C 66/73921; B29C 66/91216; B29C 66/91221; B29C 66/9141; B29C 66/91431; B29C 66/91651; B29C 66/91655; B29C 66/919; B29C 66/961; B29K 2071/00; B29K 2307/04; B29L 2031/3076; B29L 2031/3082; B64C 1/12
See application file for complete search history.

(56) References Cited

U.S. PATENT DOCUMENTS

| | | | | |
|---|---|---|---|---|
| 2015/0013898 A1* | 1/2015 | Kato | .................. | B29C 66/7212 |
| | | | | 156/274.4 |
| 2015/0266268 A1* | 9/2015 | Coxon | ................ | B29C 66/1122 |
| | | | | 428/198 |
| 2016/0046067 A1* | 2/2016 | Mizutani | ............. | B29C 66/3472 |
| | | | | 428/688 |
| 2016/0284449 A1* | 9/2016 | Haq | .................... | B29C 65/1425 |

FOREIGN PATENT DOCUMENTS

| | | | | |
|---|---|---|---|---|
| GB | 2 200 590 A | | 8/1988 | |
| JP | H 01141026 A | | 6/1989 | |
| SE | 1200532 A1 | * | 9/2014 | ............. B29C 65/34 |
| WO | WO-9921694 A1 | * | 5/1999 | ........... B29B 13/023 |

OTHER PUBLICATIONS

Asp et al., "Realisation of Structural Battery Composite Materials," 20th International Conference on Composite Materials, Copenhagen, Jul. 19-24, 11 pages (2015).

Leijonmarck et al., "Solid polymer electrolyte-coated carbon fibres for structural and novel micro batteries," Composites Science and Technology, vol. 89, ISSN 0266-3538, pp. 149-157 (2013).

German Search Report for German Application No. 10 2017 217 294.0 dated Aug. 21, 2018.

European Search Report for Application No. 18196554.2 dated Feb. 25, 2019.

* cited by examiner

METHOD FOR THE RESISTANCE WELDING OF FIBER-COMPOSITE COMPONENTS TO GIVE A FIBER-COMPOSITE STRUCTURE, FIBER-COMPOSITE STRUCTURE AND FIBER-COMPOSITE COMPONENT

CROSS-REFERENCE TO RELATED APPLICATION

This application claims priority to German Patent Application DE 10 2017 217294.0 filed Sep. 28, 2017, the entire disclosure of which is incorporated by reference herein.

TECHNICAL FIELD

The disclosure herein relates to a method for the resistance welding of fiber-composite components to give a fiber-composite structure. The disclosure herein further relates to this fiber-composite structure, and also to a fiber-composite component for use in this method.

BACKGROUND

The disclosure herein and the problems underlying the same are explained in some detail in relation to passenger aircraft, but can be used in a wide variety of applications. The methods and devices described can likewise be used in various vehicles and in all sectors of the transport industry, for example for road vehicles, for rail vehicles, for many different types of aircraft, or for watercraft. The present methods and devices can moreover be used in the production of many different types of fiber-composite components.

In modern aircraft construction, structural components of aircraft are increasingly manufactured from fiber-composite materials, e.g. from carbon-fiber-reinforced plastic. In this connection, one of the possibilities to which consideration has been given in relatively recent times is the use of thermoplastics, for example in a fuselage structure of a passenger aircraft. Thermoplastics are amenable to deformation within a certain temperature range, and therefore have ideal suitability for welding. It is hoped that the use of thermoplastics will permit further automation of production processes for large, complex structural components.

Resistance welding is an advantageous welding method for electrically conductive materials which passes an electric current through a jointing zone that is to be welded; electrical resistance then causes heating of the zone. Two adherends can thus be heated up to a melting temperature in the region of the jointing zone, thus permitting formation of a coherent bond between the adherends. The welded bond can be additionally improved by using a force and/or a pressure to press the adherends together in the jointing zone. One of the advantages of resistance welding is that no external heat source is required, the heat being introduced specifically only into a locally delimited jointing region. For a precise method, it is advantageous to maximize uniformity of distribution of temperature, i.e. therefore resistance, in the jointing zone.

There are various approaches available for applying this welding procedure to fiber-composite components. It is generally advantageous here to use suitable electrically conductive materials with appropriate heat resistance and adequate electrochemical compatibility, i.e. compatibility with the fiber-composite material. In one approach to resistance welding, a metal grid can be placed in a jointing region between two adherends, a current then being passed through the grid. In this approach, the metal grid therefore remains in the welded structure. The metal grid therefore increases the weight of the resulting fiber-composite component and creates a discontinuity in the structure of the fiber-composite component. In another approach, carbon fibers can be introduced as current-conducting components into the jointing region. From a structural point of view, this solution offers advantages specifically for the case of a carbon-fiber-reinforced fiber-composite component, because this in any case already comprises carbon fibers, and it is therefore permissible to bind the heat-generating carbon fibers permanently into the structure. If the current-conducting carbon fibers come into contact with the structural carbon fibers, leakage currents can arise in this approach, and these in turn can lead to transfer of heat into the components.

The documents Leijonmarck et al., "Solid polymer electrolyte-coated carbon fibers for structural and novel micro batteries," Composites Science and Technology, 89, 149-157, 2013 and Asp et al., "REALISATION OF STRUCTURAL BATTERY COMPOSITE MATERIALS," 20th International Conference on Composite Materials, Copenhagen, Jul. 19-24, 2015 describe the use of coated carbon fibers in structural batteries, i.e. batteries integrated into a fiber-composite structure, for example of a vehicle. The carbon fibers have a solid polymer-electrolyte coating with a thickness of several hundred nanometers, applied by an electrochemical bath (a typical diameter of carbon fibers being about 6 to 7 micrometers). This coating has, inter alia, an electrically insulating effect, and increases the fiber diameter only by about one micrometer. A coating of this type can withstand temperatures above 700° C.

SUMMARY

In the light of the above, the disclosure herein is based on an object of finding improved solutions from the resistance welding of thermoplastic fiber-composite components.

According to the disclosure herein, the object is achieved via a method with features disclosed herein, via a fiber-composite structure with features disclosed herein, via an aircraft or spacecraft with features disclosed herein and via a fiber-composite component with features disclosed herein.

Accordingly, a method is provided for the resistance welding of two fiber-composite components to give a fiber-composite structure. The method comprises arranging conductive fibers within a jointing region of the two fiber-composite components, where each conductive fiber comprises a carbon fiber with an electrically insulating coating. The method further comprises passing an electric current through the conductive fibers in a manner that heats the jointing region to a welding temperature and melts the fiber-composite components in the jointing region. The method further comprises hardening the jointing region in a manner that bonds the two fiber-composite components by way of the jointing region to give the fiber-composite structure.

A fiber-composite structure is moreover provided, produced by a method of the disclosure herein.

An aircraft or spacecraft is moreover provided, comprising a fiber-composite structure of the disclosure herein.

A fiber-composite component for use in a method of the disclosure herein is moreover provided. The fiber-composite component comprises conductive fibers integrated into the fiber-composite component in a jointing region of the fiber-composite component in a manner such that at least ends of the respective conductive fibers protrude from the fiber-composite component, where each conductive fiber comprises a carbon fiber with an electrically insulating coating.

A concept underlying the disclosure herein consists in or comprises using coated carbon fibers as electrical conductors for the resistance welding of fiber-composite components, e.g. of components which have a matrix made of plastic and carbon fibers passing through the matrix. The conductive fibers can by way of example be placed between two fiber-composite components. A power source can then be applied to ends of the fibers, in order to pass a heating current through the same. In another example, provision of the conductive fibers can be achieved in that they have already been integrated into one or both fiber-composite components, where only the ends of the conductive fibers protrude from the respective fiber-composite component. In this example, again, a current can then be introduced into the conductive fibers as soon as the two fiber-composite components have been appropriately arranged. By virtue of the electrically insulated coating of the conductive fibers, it is possible to reduce the occurrence of leakage currents or similar effects significantly, or indeed to avoid the same entirely, because it is now readily possible that the fibers come into contact with one another without any resultant leakage current or indeed short circuit. Heat losses can thus be minimized and very substantially avoided. These coatings for carbon fibers can be produced with very high heat resistance extending to above 700° C., by methods including large-scale manufacture, at relatively low cost and at efficient output rates. Possibilities therefore include welding of thermoplastics which are particularly suitable for use in the aircraft and spacecraft sector. By way of example, it is thus readily possible to weld polyetheretherketone (PEEK), the melting point of which is above 300° C. A further advantage of the disclosure herein is obtained in that the carbon fibers of the conductive fibers can serve directly as reinforcement fibers of the fiber-composite components and to a certain extent form a natural constituent of these, with no resultant discontinuities or electrochemical reactions. Selection of the electrically insulating coating can moreover be optimized in a manner such that converse effects on binding behaviour are avoided, i.e. the binding behaviour of the conductive fibers is similar to that of uncoated carbon fibers.

Advantageous embodiments and further developments are found in the other dependent claims, and also in the description with reference to the figures.

According to a further development, the arranging can comprise a placing of the fiber-composite components in closest-possible contact with one another at a jointing area. The fiber-composite components are therefore welded to one another at the jointing area, in order to form a higher-order fiber-composite structure. It is possible here that the shapes of the fiber-composite components have already been matched to one another in a manner such that these must merely be brought into contact with one another (possibly with carbon fibers located therebetween) in order to achieve a high-quality weld (for example with no additional pressing of the fiber-composite components against one another).

At least a proportion of the conductive fibers can be arranged in the jointing area between the two fiber-composite components. By way of example, a textile made of coated carbon fibers can be placed onto one of the two fiber-composite components, and the other fiber-composite component can then be placed onto the textile and the fiber-composite component located thereunder. The textile can be configured in a manner such that the ends of the carbon fibers, i.e. their respective two ends, protrude beyond the fiber-composite components, thus permitting connection of a power source to the ends.

According to a further development, at least a proportion of the conductive fibers can be integrated into at least one of the two fiber-composite components in the jointing region in a manner such that at least ends of the respective conductive fibers protrude from the respective fiber-composite component. It is therefore advantageously possible that the conductive fibers are by way of example directly integrated into the fiber-composite components during the manufacture of the same. In principle, the conductive fibers can be processed and treated in the production of the fiber composite in exactly the same manner as uncoated carbon fibers that are conventionally used. The conductive fibers can moreover indeed function directly as reinforcement fibers of the fiber-composite component. However, it is in principle equally possible to delay integration of the conductive fibers into the fiber-composite components until a subsequent juncture after manufacture, e.g. in that passage openings into which the conductive fibers can be introduced are provided in the composite component. The conductive fibers can advantageously be integrated into the fiber-composite components at the periphery in the vicinity of a surface. The manner of integration can therefore be optimized in accordance with the jointing regions subsequently to be utilized during resistance welding. By way of example, the conductive fibers can be integrated into the fiber-composite component in the vicinity of a surface and in essence parallel to the same, where the surface can subsequently be utilized as jointing area.

According to a further development, the arranging can comprise pressing of the two fiber-composite components against one another. However, for some applications it can equally be sufficient merely to bring the two fiber-composite components into contact, for example by placing one of the fiber-composite components onto the other fiber-composite component at a jointing area. However, in some applications the quality of the weld can be improved by using a force or a pressure to press the fiber-composite components against one another. In particular, it is thus possible to ensure that the two fiber-composite components are in close contact across the entire jointing area, and that the prescribed welding temperature is appropriately achieved and maintained across the entire jointing area.

According to a further development, the conductive fibers can be arranged in the form of at least one of the following group: bundles, tapes, mats, woven fabrics, non-woven fabrics, laid scrims and individual fibers, and the like. In principle, the conductive fibers can be arranged, or integrated, in a variety of variants known to the person skilled in the art and are known from the general manufacture of fiber-composite components.

According to a further development, the method can moreover comprise recording the welding temperature. The method can moreover comprise regulating the electrical current on the basis of the recorded welding temperature. In this further development, the current passed through the conductive fibers can be adjusted appropriately at any time in the event that a deviation from a prescribed welding temperature should occur, locally or globally, for example because of defects in materials or defects in handling during the arrangement of the fiber-composite components, or the like.

The welding temperature can be recorded by a thermographic camera. By way of example, it is possible to use one or more thermal imaging cameras which detect infrared radiation emitted from the fiber-composite components and convert the same into electrical signals.

The welding temperature can be recorded by a temperature sensor. The temperature sensor can have been integrated into the fiber-composite components. An integrated temperature sensor offers the advantage that the temperature can be measured directly at the jointing region or at the jointing area, or at least in the vicinity thereof. It is thus possible to obtain a very realistic image of the welding process, and to use this image to optimize regulation of the process.

According to a further development, the welding temperature can correspond at least to a melting point of polyetheretherketone. In particular, the welding temperature can be set to above 300° C. or indeed above 380° C., e.g. to 400° C. or higher, thus ensuring that polyetheretherketone (PEEK) is melted. PEEK is a thermoplastic with a very high melting point and moreover offers advantages particularly in the aircraft and spacecraft sector.

According to a further development of the method, conductive fibers having a polymer-electrolyte coating as electrically insulating coating can be used. Accordingly, according to a further development of the fiber-composite component, the electrically insulating coating can be configured as polymer-electrolyte coating, in particular as solid polymer-electrolyte coating. By way of example, the polymer-electrolyte coating can comprise a methoxy polyethylene glycol monomethacrylate. The heat resistance of these polymer-electrolyte coatings can extend to at least 700° C., where at the same time the coatings offer excellent binding properties for binding into fiber-reinforced components, e.g. carbon-fiber-reinforced thermoplastic.

According to a further development, the electrically insulating coating can have a thickness in the range from 0.1 micrometer to 1 micrometer. In particular, the electrically insulating coating can have a thickness of 0.5 micrometer. The carbon fibers can by way of example have a diameter of from 6 to 7 micrometers, the resulting diameter of the conductive fibers therefore being about 7 to 8 micrometers.

The above embodiments and further developments can, insofar as this is useful, be combined in any desired manner with one another. Other possible embodiments, further developments and implementations of the disclosure herein also comprise combinations not explicitly mentioned of features of the disclosure herein that are described above or hereinafter in relation to the Inventive Examples. In particular, the person skilled in the art will also add individual aspects as improvements or supplements to the respective basic form of the disclosure herein.

BRIEF DESCRIPTION OF THE DRAWINGS

The disclosure herein is explained in more detail below with reference to the Inventive Examples provided in the diagrams of the Figures.

DETAILED DESCRIPTION

Figure 1:
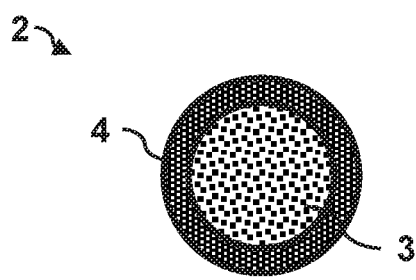
FIG. 1 is a diagrammatic cross-sectional view of a conductive fiber for use in a method for the resistance welding of two fiber-composite components according to an embodiment of the disclosure herein.
Figure 1:
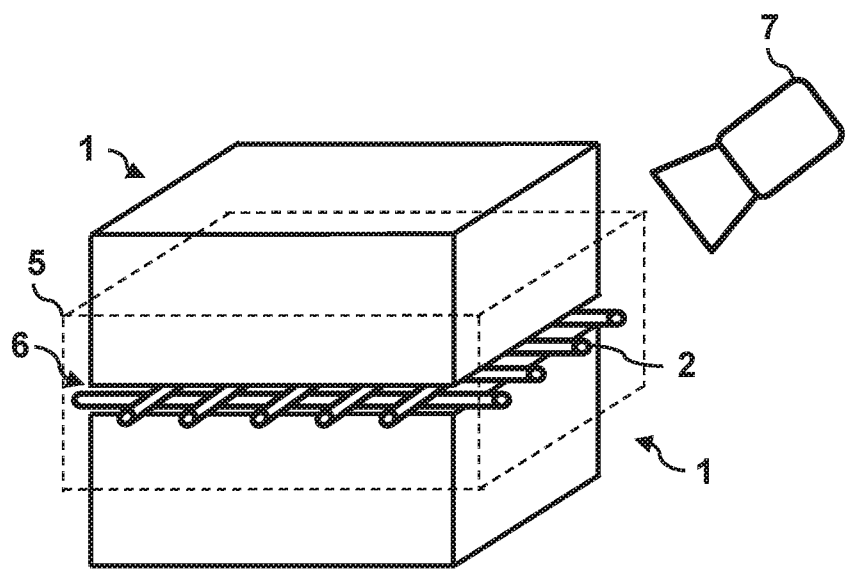

The figures attached are intended to increase understanding of the embodiments of the disclosure herein. They illustrate embodiments, and serve in conjunction with the description to explain principles and concepts of the disclosure herein. Other embodiments, and many of the advantages mentioned, are apparent from the drawings. The elements of the drawings have not necessarily been shown in true scale in relation to one another.

Unless otherwise stated, elements, features and components that are identical or functionally identical or have identical effect in each case have the same reference signs in the figures of the drawing.

FIG. 1 is a diagrammatic cross-sectional view of a conductive fiber 2 for use in a method M for the resistance welding of two fiber-composite components 1 according to an embodiment of the disclosure herein.

The conductive fiber 2 comprises a carbon fiber 3, provided with an electrically insulating coating 4. The electrically insulating coating 4 is configured as solid polymer-electrolyte coating. This type of electrochemical coating can by way of example be produced by immersing the carbon fiber 3 into a suitable electrochemical bath. In a specific example, the coating can be achieved via polymerization of methoxy polyethylene glycol monomethacrylate. By way of example, the carbon fiber 3 can have a diameter of from 6 to 7 micrometers. This type of solid polymer-electrolyte coating can be configured very thinly, for example with a thickness of 0.5 micrometer, the resultant overall diameter of the conductive fiber 2 being about 7 to 8 micrometers. This type of coating can moreover withstand temperatures above 700° C., and therefore has ideal suitability for the welding of thermoplastics such as PEEK.

This configuration of the conductive fiber 2 offers a number of advantages for the use in a resistance welding method. Firstly, the properties of the conductive fiber 2, in respect of structure, and also in relation to compatibility thereof with fiber-composite material, are similar to those of a conventional carbon fiber. It can therefore readily be used as reinforcement fiber in fiber-composite components, or integrated into the same, without any occurrence of undesired reactions. Secondly, the solid polymer-electrolyte coating is configured as electrical insulator which can insulate a conductive fiber 2 electrically from other conductive fibers 2, without any occurrence of leakage currents and/or short circuit between multiple conductive fibers 2 through which current is flowing and adjacent conductive fibers 2. This type of conductive fiber 2 is moreover sufficiently heat-resistant for welding of PEEK. Advantageous uses of such conductive fibers 2 in method M for the resistance welding of two fiber-composite components 1 are explained below with reference to the other figures.

Figure 2:
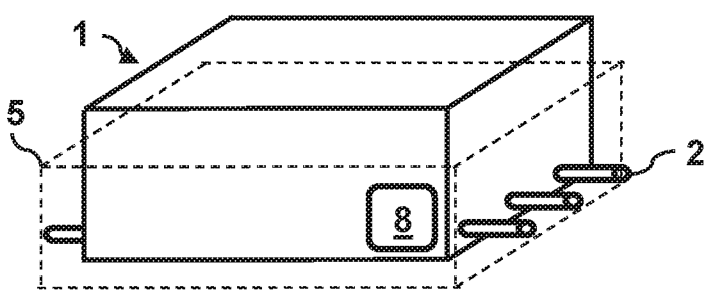
FIG. 2 is a diagrammatic perspective view of fiber-composite components with conductive fibers corresponding to FIG. 1 located therebetween.
Figure 4:
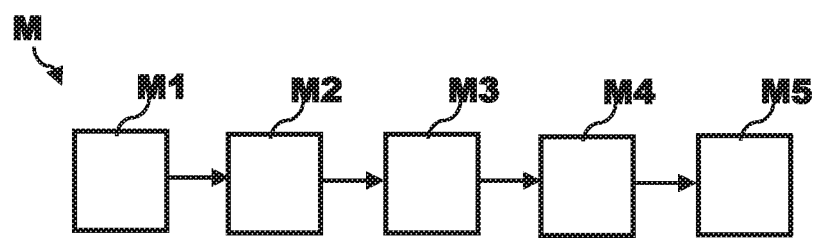
FIG. 4 is a flow diagram of a method for the resistance welding of two fiber-composite components as used in FIG. 2 or 3.

To this end, FIG. 2 is a diagrammatic perspective view of fiber-composite components 1 with the conductive fibers 2 shown in FIG. 1, while FIG. 4 is a flow diagram of a corresponding method M for the resistance welding of two fiber-composite components 1.

The fiber-composite components 1 can by way of example have a matrix made of thermoplastic and is reinforced by a large number of carbon fibers. Thermoplastic can by way of example be polyetheretherketone (PEEK), which can have a very high melting point of about 380° C. The two fiber-composite components 1 are depicted purely diagrammatically in FIG. 2 as identically configured, rectangular blocks. In a specific use, the fiber-composite components 1 can by way of example be structural components for the fuselage of an aircraft 100, e.g. a passenger aircraft (cf. FIG. 5). The fiber-composite components 1 have been arranged above the other in a jointing region 5, and a large number of conductive fibers 2 have been provided in a sheet-like, grid-like arrangement in a jointing area 6 between the fiber-composite components 1. The conductive fibers 2 here protrude laterally from the jointing region 5. This arrangement of the fiber-composite components 1 and of the conductive fibers 2 is merely one example. In principle, the person skilled in the art can introduce conductive fibers 2 appropriate for a particular use, in the form of bundles, tapes, mats, woven fabrics, non-woven fabrics, laid scrims and/or individual fibers or the like, in a sheet-like arrangement or any other type of arrangement.

The method M accordingly comprises, as M1 (cf. FIG. 4), arranging the conductive fibers 2 within the jointing region 5 of the two fiber-composite components 1, where the fiber-composite components 1 are brought into closest-possible contact with one another at the jointing area 6, and at least a proportion of the conductive fibers 2 is arranged in the jointing area 6 between the two fiber-composite components 1. The method M moreover comprises, as M2, passing an electric current through the conductive fibers 2 in a manner that heats the jointing region 5 to a welding temperature and melts the fiber-composite components 1 in the jointing region 5. To this end it is possible by way of example to connect a power source from outside of the jointing region 5 to the conductive fibers 2. A force and/or a pressure can additionally be used to press the two fiber-composite components 1 against one another, in order to assist the binding of the components and to maximize uniformity of temperature distribution and, respectively, guarantee that the fiber-composite components 1 are in close contact across the entire jointing area 6.

The method M can moreover comprise, as M3, recording of the welding temperature and, as M4, regulating the electrical current on the basis of the welding temperature recorded. To this end, in this example of an embodiment a thermographic camera 7 is provided, for example a thermal imaging camera, which continuously records the welding temperature in a manner that permits, where appropriate, local or global adjustment of the electrical current if the welding temperature deviates from the desired temperature. Because PEEK is used in the present case as thermoplastic, care must be taken that the welding temperature at least exceeds the melting point of PEEK. An example of a welding temperature that could clearly be used as process temperature would be about 400° C.

Figure 5:
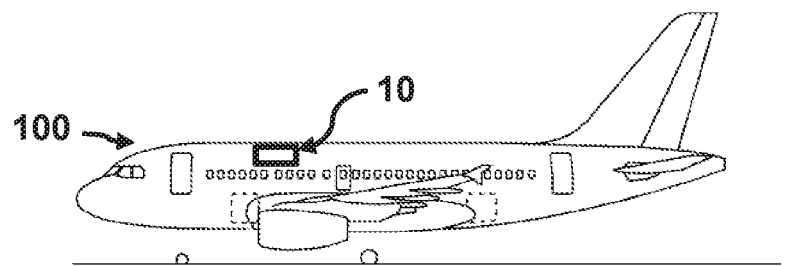
FIG. 5 is a diagrammatic side view of an aircraft with a fiber-composite structure produced by the method from FIG. 4.

Finally, the method comprises, as M5, hardening of the jointing region 5 in a manner such that the two fiber-composite components 1 are bonded by way of the jointing region 5 to give a fiber-composite structure 10. The protruding ends of the conductive fibers 2 can be removed. This fiber-composite structure 10 can by way of example be a higher-order structural component for an aircraft 100. FIG. 5 shows by way of example an aircraft 100 into which a fiber-composite structure 10 produced by the present method M, e.g. a strengthening element, a stringer, a crossmember, an external skin section, a ceiling panel, a floor panel and/or a wall panel or the like, has been introduced.

With the aid of the method M described it is therefore possible to produce a fiber-composite structure 10 from two fiber-composite components 1 by a resistance welding method that is efficient and that can easily be automated. The conductive fibers 2, which have a core made of carbon fibers 3, serve as current conductors here (i.e. as providers of resistance to generate the heat for welding), the individual conductive fibers 2 being insulated from one another by virtue of the electrically insulating coating 4. Leakage currents and undesired heat losses are thus prevented. There is no need to use metal grids or similar disadvantageous materials. Instead, carbon fibers 3 with a high-compatibility coating are used, and these can bind into the fiber-composite components 1 without any disadvantageous results, and moreover can serve to reinforce the components.

Figure 3:
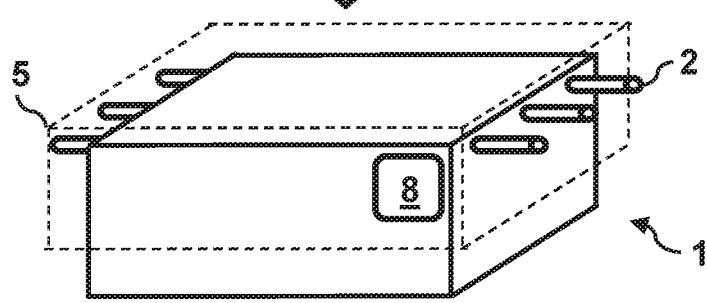
FIG. 3 is a diagrammatic perspective view of fiber-composite components for use in a method for resistance welding according to another embodiment of the disclosure herein.

FIG. 3 is a diagrammatic perspective view of fiber-composite components 1 for use in a method M for resistance welding according to another embodiment of the disclosure herein.

Unlike the embodiment shown in FIG. 2, in this example the conductive fibers 2 have been integrated into the fiber-composite components 1 in a jointing region 5 in a manner such that ends of these protrude from the fiber-composite components 1. In FIG. 3, the conductive fibers 2 have been arranged, purely by way of example, parallel and alongside one another in the vicinity of a surface of the respective fiber-composite component 1. In this embodiment, the surface serves as jointing area 6 at which the two fiber-composite components 1 are placed in closest-possible contact with one another before a current is passed through the conductive fibers 2 (cf. the arrow in FIG. 3). By way of example, the conductive fibers 2 can be integrated directly into the fiber-composite components 1 during manufacture of the components, and can provide reinforcement. However, it is in principle equally possible that integration of the conductive fibers 2 into the fiber-composite components 1 is delayed until a subsequent juncture after manufacture. As soon as the fiber-composite components 1 have been placed into closest-possible contact with one another, a current is introduced into the conductive fibers 2, by way of which the fiber-composite components 1 are then welded to one another. The welding temperature can be recorded in this embodiment by way of example by temperature sensors 8 which have respectively been integrated into the fiber-composite components 1 in the vicinity of the conductive fibers 2 and can therefore determine the temperature directly in the jointing region 5. After hardening M5 of the jointing region 5, the protruding ends of the conductive fibers 2 can be removed, e.g. by cutting.

In principle, the disclosure herein is not restricted to the embodiments described. By way of example, the two embodiments from FIGS. 2 and 3 can be combined with one another in a manner such that a proportion of the conductive fibers 2 can have been arranged between the fiber-composite components 1 whereas another proportion of the conductive fibers 2 can already have been integrated into the fiber-composite components 1 during manufacture.

In the interests of conciseness, various features have been brought together in one or more examples in the detailed description above. However, it should be clear here that the above description is merely illustrative, and in no way restrictive. It serves to cover all of the alternatives, modifications and equivalents of the various features and Inventive Examples. After consideration of the above description, the person skilled in the art will immediately and directly conceive of many other examples on the basis of a person's technical knowledge.

The Inventive Examples have been selected and described with the aim of providing the best possible description of the principles underlying the disclosure herein and the possibilities for practical use of the principles. Persons skilled in the art can thus optimize modification and use of the disclosure herein and the various Inventive Examples thereof in relation to the intended application. In the claims, and also in the description, the words "including" and "having" are used as neutral words with the meaning "comprising". Use of the words "a" and of "one" moreover is not intended in principle to exclude a plurality of features and components thus described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

KEY

1 Fiber-composite component
2 Conductive fiber
3 Carbon fiber
4 Electrically insulating coating
5 Jointing region
6 Jointing area
7 Thermographic camera
8 Temperature sensor
10 Fiber-composite structure
100 Aircraft
M Method
M1 Method step
M2 Method step
M3 Method step
M4 Method step
M5 Method step

The invention claimed is:

1. A method for resistance welding of two fiber-composite components to give a fiber-composite structure, the method comprising:
   arranging a plurality of individual conductive fibers in a form of a first layer having a first portion of the plurality of individual conductive fibers and a second layer having a second portion of the plurality of individual conductive fibers, the first layer and the second layer being within a jointing region of the two fiber-composite components, wherein:
      all conductive fibers of the first portion of the plurality of individual conductive fibers extend in a first direction within the first layer;
      all conductive fibers of the second portion of the plurality of individual conductive fibers extend in a second direct, the second direction being transverse to the first direction within the second layer;
      the first layer is on top of the second layer, such that the conductive fibers in the first layer and the conductive fibers in the second layer form a grid;
      the plurality of individual conductive fibers are arranged between the fiber-composite components;
      the fiber-composite components are arranged on opposite sides of the jointing region; and
      each of the plurality of individual conductive fibers comprises a carbon fiber with an electrically insulating coating;
   passing an electric current through the plurality of individual conductive fibers to heat the jointing region to a welding temperature and melt the fiber-composite components in the jointing region; and
   hardening the jointing region to bond the two fiber-composite components by way of the jointing region to give the fiber-composite structure.

2. The method according to claim 1, where the fiber-composite components are placed in contact with one another at a jointing area, which is within the jointing region.

3. The method according to claim 2, where at least a proportion of the plurality of individual conductive fibers is arranged in the jointing area between the two fiber-composite components.

4. The method according to claim 1, comprising pressing the two fiber-composite components against one another.

5. The method according to claim 1, where:
   the conductive fibers of the first portion of the plurality of individual conductive fibers protrude from the jointing region in the first direction; and
   the conductive fibers of the second portion of the plurality of individual conductive fibers protrude from the jointing region in the second direction.

6. The method according to claim 1, comprising:
   recording the welding temperature; and
   regulating the electric current on the basis of the recorded welding temperature.

7. The method according to claim 6, where:
   the welding temperature is recorded by a thermographic camera; or
   the welding temperature is recorded by a temperature sensor integrated into the fiber-composite components.

8. The method according to claim 1, where the fiber-composite components each comprise a matrix of a thermoplastic and are reinforced by a plurality of carbon fibers.

9. The method according to claim 1, where:
   the fiber-composite components each comprise a matrix of a thermoplastic comprising polyetheretherketone (PEEK); and
   the welding temperature is a same as or greater than a melting point of PEEK.

10. The method according to claim 1, where the plurality of individual conductive fibers have a polymer-electrolyte coating as the electrically insulating coating.

11. The method according to claim 1, wherein:
    the conductive fibers of the first portion of the plurality of individual conductive fibers protrude from the jointing region in the first direction; and
    the conductive fibers of the second portion of the plurality of individual conductive fibers protrude from the jointing region in the second direction.

12. The method according to claim 11, comprising:
    recording the welding temperature; and
    regulating the electric current on the basis of the recorded welding temperature.

13. The method according to claim 12, wherein:
    the welding temperature is recorded by a thermographic camera; or
    the welding temperature is recorded by a temperature sensor integrated into the fiber-composite components.

14. The method according to claim 13, wherein:

the electrically insulating coating is a polymer-electrolyte coating formed by, for each of the plurality of individual conductive fibers, polymerization of methoxy polyethylene glycol monomethacrylate; and/or forming the polymer-electrolyte coating comprises immersion of the carbon fiber for each of the plurality of individual conductive fibers into an electrochemical bath.

15. The method according to claim 14, wherein:

the electrically insulating coating can withstand a temperature of at least 700° C.;

the fiber-composite components each comprise a matrix of polyetheretherketone (PEEK); and the welding temperature is the same as or greater than a melting point of polyetheretherketone.

16. The method according to claim 15, comprising connecting a power source to ends of the conductive fibers in the second portion of the plurality of individual conductive fibers that protrude from the jointing region in a lateral direction, wherein the electric current passes through the ends of the conductive fibers to heat the jointing region.

* * * * *